US011805397B2

(12) United States Patent
Li et al.

(10) Patent No.: US 11,805,397 B2
(45) Date of Patent: Oct. 31, 2023

(54) IMEI BINDING AND DYNAMIC IMEI PROVISIONING FOR WIRELESS DEVICES

(71) Applicant: Apple Inc., Cupertino, CA (US)

(72) Inventors: Li Li, Los Altos, CA (US); Vikram Bhaskara Yerrabommanahalli, San Ramon, CA (US); Rafael L. Rivera-Barreto, Santa Clara, CA (US); Sherman X. Jin, Santa Clara, CA (US); Clive E. Rodgers, Palo Alto, CA (US); Najeeb M. Abdulrahiman, Fremont, CA (US)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 17/305,859

(22) Filed: Jul. 15, 2021

(65) Prior Publication Data
US 2022/0022014 A1 Jan. 20, 2022

Related U.S. Application Data

(60) Provisional application No. 63/052,439, filed on Jul. 15, 2020.

(51) Int. Cl.
*H04W 88/06* (2009.01)
*H04B 1/3816* (2015.01)
*H04W 4/50* (2018.01)
*H04W 8/18* (2009.01)

(52) U.S. Cl.
CPC .............. *H04W 4/50* (2018.02); *H04W 8/183* (2013.01)

(58) Field of Classification Search
None
See application file for complete search history.

(56) References Cited

U.S. PATENT DOCUMENTS

2015/0373778 A1* 12/2015 Holtmanns ........... H04W 88/06
455/558

* cited by examiner

*Primary Examiner* — Gary Lafontant
(74) *Attorney, Agent, or Firm* — DICKINSON WRIGHT RLLP

(57) ABSTRACT

This Application sets forth techniques for binding and dynamic provisioning of international mobile equipment identifier (IMEI) values with cellular wireless service profiles, such as subscriber identity modules (SIMS) on physical SIM (pSIM) cards and electronic SIMs (eSIMs) on an embedded universal integrated circuit card (eUICC) of the mobile wireless device. When pSIMs and/or eSIMs change on the mobile wireless device, e.g., based on installation, activation, deactivation, de-installation, etc., IMEI binding logic accounts for the changes and maps IMEI values to pSIMs and/or eSIMs as required. IMEI values can be assigned based on a history of bindings between IMEI values and ICCID values of one or more eSIMS on an eUICC. A most recently used or a newly assigned IMEI value can be associated with an eSIM. Whether to assign an identical IMEI value to multiple eSIMs depends on requirements of associated cellular wireless service subscriptions.

19 Claims, 6 Drawing Sheets

400

ES10c IMEI BINDING COMMANDS

```
-- ASN1START
-- Definition of Bind IMEI
bindIMEIRequest ::= [41] SEQUENCE {
profileIdentifier CHOICE {
isdpAid [APPLICATION 15] OctetTo16,
Iccid ICCid
},
Imei [17] UTF8String (SIZE(0..64))
}
-- ASN1STOP Response Data
The response data SHALL be coded as follows:

-- ASN1START
bindIMEIResponse ::= [41] SEQUENCE {
bindIMEIResult INTEGER {ok(0), iccidNotFound(1), undefinedError(127)}
}
--ASN1STOP
```

IMEI BINDING AND DYNAMIC IMEI PROVISIONING FOR WIRELESS DEVICES

CROSS-REFERENCE TO RELATED APPLICATIONS

The present application claims the benefit of U.S. Provisional Application No. 63/052,439, entitled "IMEI BINDING AND DYNAMIC IMEI PROVISIONING FOR WIRELESS DEVICES," filed Jul. 15, 2020, the content of which is incorporated by reference herein in its entirety for all purposes.

FIELD

The described embodiments set forth techniques for binding and dynamic provisioning of international mobile equipment identifier (IMEI) values for a wireless device.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices.

A hardware identifier, e.g., an international mobile equipment identifier (IMEI) value can be used to identify a wireless device with an MNO, such as for managing access to cellular wireless services. Using the same IMEI value for different cellular wireless service subscriptions may trigger fraud detection inadvertently.

SUMMARY

Representative embodiments set forth techniques for binding and dynamic provisioning of international mobile equipment identifier (IMEI) values with cellular wireless service profiles and/or with cellular wireless service subscriptions for a mobile wireless device. Examples of a cellular service profile include a subscriber identity module (SIM) on a universal integrated circuit card (UICC), also referred to as physical SIM (pSIM) on a SIM card, or an electronic SIM (eSIM) on an embedded UICC (eUICC). With increased flexibility in managing cellular wireless service subscriptions, such as when downloading and installing profiles (e.g., eSIMs) to access different cellular wireless services, IMEI values assigned to the mobile wireless device can be used with different profiles when the profiles are active. A mobile wireless device can include a telephony module for communicating with a baseband module that manages profile information for pSIMs and eSIMs and also accounts for different MNO cellular wireless service subscriptions, e.g., via a subscription mapping module. Multiple IMEI values can be stored on the mobile wireless device, e.g., securely in the baseband module, and mapping to various pSIMs and/or eSIMs on the mobile wireless device. As the mixture of pSIMs and/or eSIMs change on the mobile wireless device, e.g., based on installation, activation, deactivation, de-installation, etc., IMEI binding logic can account for the changes and map IMEI values to pSIMs and/or eSIMs as required. Firmware in the eUICC can ensure that IMEI values are not changed by an MNO server, e.g., during an OTA update of an eSIM. IMEI values can be assigned based on a history of bindings between IMEI values and ICCID values of one or more eSIMS on an eUICC. A most recently used IMEI value can be associated with an eSIM or a newly assigned IMEI value can be associated with the eSIM. Whether to assign the identical IMEI value to multiple eSIMs can be based, at least in part, on capabilities and/or requirements for associated cellular wireless service subscriptions and/or MNO operators thereof.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIG. 4 illustrates exemplary IMEI binding commands, according to some embodiments.

DETAILED DESCRIPTION

Figure 1:
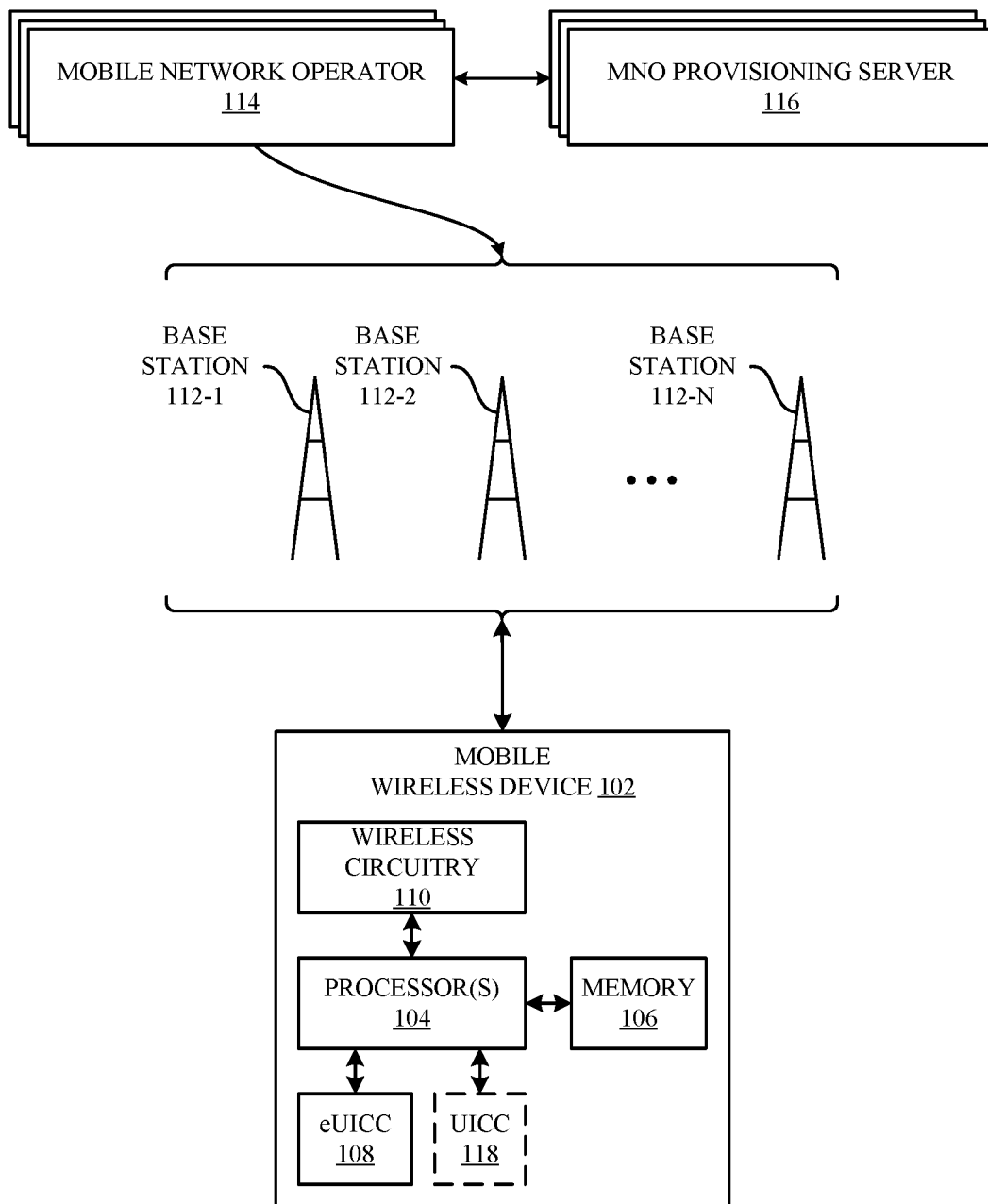
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This Application sets forth techniques for binding and dynamic provisioning of international mobile equipment identifier (IMEI) values with cellular wireless service profiles and/or with cellular wireless service subscriptions for a mobile wireless device. Examples of a cellular service profile include a subscriber identity module (SIM) on a universal integrated circuit card (UICC), also referred to as physical SIM (pSIM) on a SIM card, or an electronic SIM (eSIM) on an embedded UICC (eUICC). Mobile wireless devices are typically provisioned with i) a single IMEI value, such as for a mobile wireless device that has a bay for receiving a single physical SIM card, or ii) with a pair of IMEI values, such as for a dual-SIM, dual-standby (DSDS) device that accommodates two physical SIM cards, or for a DSDS device that includes an eUICC (on which one or more eSIMs can be installed) and a UICC-receiving bay for a single physical SIM card. With increased flexibility in managing cellular wireless service subscriptions, such as when downloading and installing profiles (e.g., eSIMs) to access different cellular wireless services, IMEI values assigned to the mobile wireless device can be used with different profiles when the profiles are active. For mobile wireless devices that are restricted to a single physical SIM card associated with one IMEI value and only one active eSIM on an eUICC at any one time, where the active eSIM is associated with a second IMEI value, use of two IMEI values in parallel can be accommodated by assigning two distinct IMEI values during manufacture of the mobile wireless device, one IMEI value to be used with a physical SIM card and a second IMEI value to be used with an active eSIM on the eUICC of the mobile wireless device. For mobile wireless devices that allow for multiple eSIMs to be active at one time, using the same IMEI value for different eSIMs at the same time, or using the same IMEI value for a physical SIM card and an eSIM at the same time, can cause issues. In some circumstances, simultaneous use of the same IMEI value for two different SIMs/eSIMs can trigger fraud detection by a mobile network operator (MNO), particularly when cellular wireless services of the same MNO are accessed using the two different SIMs/eSIMs by the mobile wireless device. To address this problem, this Application proposes solutions that include mechanisms for binding IMEI values to SIMs/eSIMs and dynamic provisioning of IMEI values.

A mobile wireless device can include a telephony module for communicating with a baseband module that manages profile information for pSIMs and eSIMs and also accounts for different MNO cellular wireless service subscriptions, e.g., via a subscription mapping module. Multiple IMEI values can be stored on the mobile wireless device, e.g., securely in the baseband module, and mapping to various pSIMs and/or eSIMs on the mobile wireless device. As the mixture of pSIMs and/or eSIMs change on the mobile wireless device, e.g., based on installation, activation, deactivation, de-installation, etc., IMEI binding logic can account for the changes and map IMEI values to pSIMs and/or eSIMs as required. Firmware in the eUICC can ensure that IMEI values are not changed by an MNO server, e.g., during an OTA update of an eSIM. IMEI values can be assigned based on a history of bindings between IMEI values and ICCID values of one or more eSIMS on an eUICC. A most recently used IMEI value can be associated with an eSIM or a newly assigned IMEI value can be associated with the eSIM. Whether to assign the identical IMEI value to multiple eSIMs can be based, at least in part, on capabilities and/or requirements for associated cellular wireless service subscriptions and/or MNO operators thereof.

These and other embodiments are discussed below with reference to FIGS. 1-6; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile wireless device 102, which can also be referred to as a wireless device, a wireless device, a mobile device, a user equipment (UE) and the like, a group of base stations 112-1 to 112-N that are managed by different Mobile Network Operators (MNOs) 114, and a set of provisioning servers 116 that are in communication with the MNOs 114. Additional MNO infrastructure servers, such as used for account management and billing are not shown. The mobile wireless device 102 can represent a mobile computing device (e.g., an iPhone® or an iPad® by Apple®) or a cellular-capable wearable device (e.g., an Apple Watch), the base stations 112-1 to 112-$n$ can represent cellular wireless network entities including evolved NodeBs (eNodeBs or eNBs) and/or next generation NodeBs (gNodeBs or gNB) that are configured to communicate with the mobile wireless device 102, and the MNOs 114 can represent different wireless service providers that provide specific cellular wireless services (e.g., voice and data) to which the mobile wireless device 102 can subscribe, such as via a subscription account for a user of the mobile wireless device 102.

As shown in FIG. 1, the mobile wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the mobile wireless device 102 includes one or more physical UICCs 118, also referred to as Subscriber Identity Module (SIM) cards, in addition to or substituting for the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMS (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the mobile wireless device 102 is associated. To be able to access services provided by an MNO 114, an eSIM is reserved for subsequent download and installation to the eUICC 108. In some embodiments, the eUICC 108 obtains one or more eSIMs from one or more associated provisioning servers 116. The provisioning servers 116 can be maintained by a manufacturer of the mobile wireless device 102, the MNOs 114, third party entities, and the like. Communication of eSIM data between an MNO provisioning server 116 and the eUICC 108 (or between the MNO provisioning server 116 and processing circuitry of the mobile wireless device 102 external to the eUICC 108, e.g., the processor 104) can use a secure communication channel.

Figure 2:
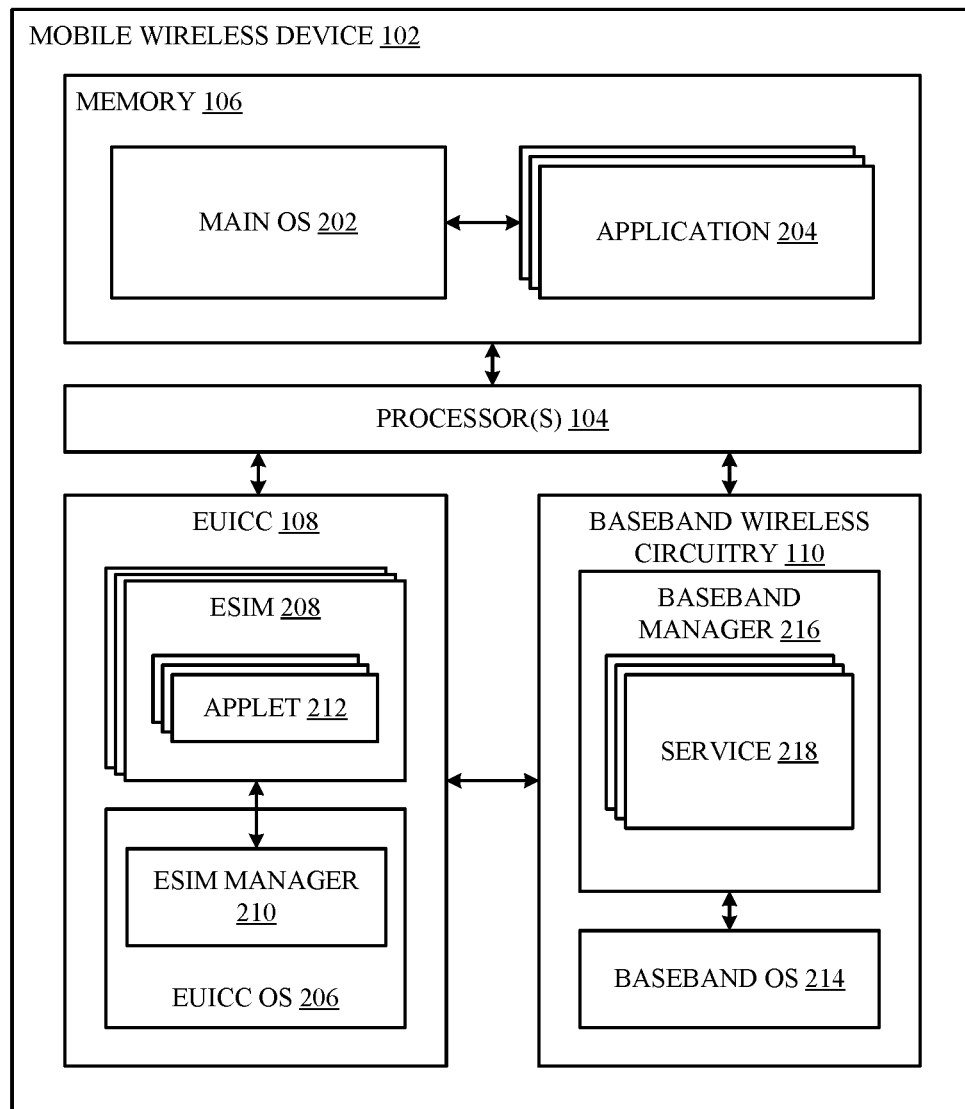
FIG. 2 illustrates a block diagram of a more detailed view of exemplary components of the system of FIG. 1, according to some embodiments.

FIG. 2 illustrates a block diagram of a more detailed view 200 of particular components of the mobile wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing baseband wireless circuitry 110 with access to the eSIMs 208 to provide access to wireless services for the mobile wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the mobile wireless device 102 to communicate with an MNO 114 and provide useful features (e.g., phone calls and internet access) to a user of the mobile wireless device 102.

As also shown in FIG. 2, the baseband wireless circuitry 110 of the mobile wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3:
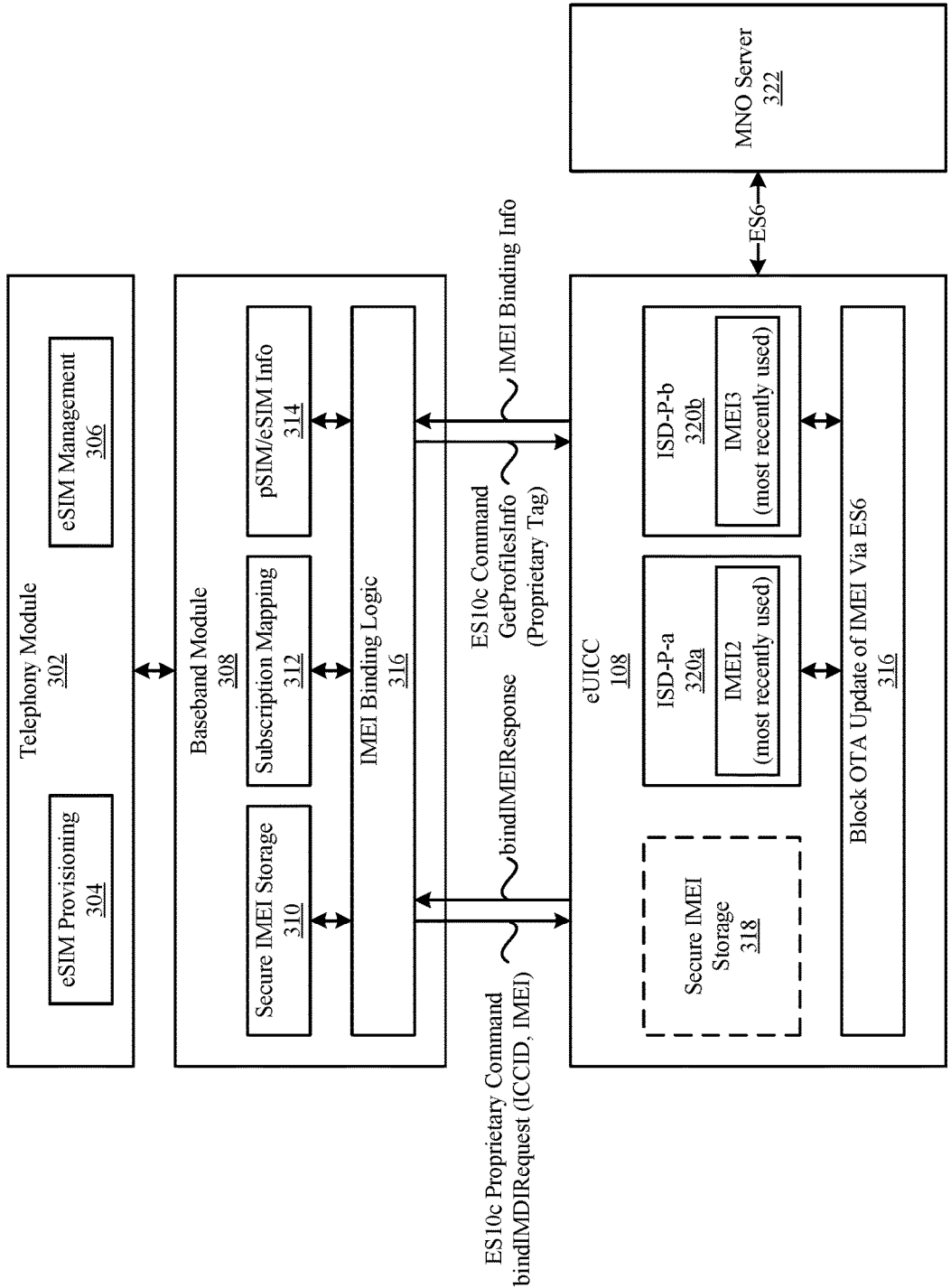
FIG. 3 illustrates a block diagram of an exemplary system for binding international mobile equipment identifier (IMEI) values with cellular wireless service profiles and/or cellular wireless service subscriptions for a wireless device, according to some embodiments.

FIG. 3 illustrates a diagram 300 of an exemplary system for binding international mobile equipment identifier (IMEI) values with cellular wireless service profiles (e.g., SIM cards and/or eSIMs 208) and/or with cellular wireless service subscriptions for a mobile wireless device 102. A telephony module 302 can be resident on a processor 104 of the mobile wireless device 102 and manage cellular wireless service profiles using an eSIM provisioning module 304 and an eSIM management module 306. The telephony module 302 can communicate with a baseband module 308 that includes cellular wireless service profile information, such as pSIM/eSIM information 314 for one or more physical SIM cards (UICCs 118) and/or one or more eSIMs 208 stored on the eUICC 108 of the mobile wireless device 102. The baseband module 308 can also include a subscription mapping module 312 to account for different MNO cellular wireless service subscriptions of a user of the mobile wireless device 102 and their use with different UICCs 118 and/or eSIMs 208 installed on the eUICC 108 of the mobile wireless device 102. The baseband module 308 can further include secure IMEI storage 310 to store IMEI values that can be associated with active pSIMs and/or active eSIMs 208 (or previously associated with inactive pSIMs and/or eSIMs 208). An IMEI binding logic module 316 can interface with the various modules of the baseband module 308, e.g., with secure IMEI storage 310, subscription mapping module 312, and/or pSIM/eSIM information 314, and communicate between these modules and the eUICC 108. The baseband module 308 accounts for use of the mobile wireless device 102, including the mixture of pSIMs and eSIMs 208 that are used, and communicates with the eUICC 108, via the IMEI binding logic 316, to request IMEI values to associate (bind) with specific SIM/eSIM identifier values, e.g., with particular international circuit card identifier (ICCID) values. The IMEI binding logic 316 can also obtain information from the eUICC 108, by inquiring about a present set of IMEI associations (bindings) used by the eUICC 108. The IMEI binding logic 316 can account for changes in use of different SIMS/eSIMs to bind IMEI values to the SIMS/eSIMs in active use by the mobile wireless device 102. Firmware in the eUICC 108 can also ensure that IMEI values used by eSIMs 208 are not changed by an MNO server 322, e.g., by precluding over-the-air (OTA) updates to IMEI values via the ES6 interface. Blocking OTA updates of IMEI binding information by the eUICC 108 can also protect against a denial of service (DoS) attack. IMEI values can be optionally stored securely in secure IMEI storage 318 of the eUICC 108. Within individual secure storage containers of the eUICC 108, e.g., within profile issuer security domains (ISD-Ps) 320, such as ISD-P-a 320a and ISD-P-b 320b, most recently used IMEI values for the profile of that ISD-P 320 can be maintained. For example, ISD-P-a 320a shows IMEI2 as the most recently used IMEI value for the profile of ISD-P-a, and ISD-P-b 320b shows IMEI3 as the most recently used IMEI value for the profile of ISD-P-b. The IMEI binding logic 316 of the baseband module 308 can send an ES10c proprietary command bindIMEIRequest to the eUICC 108 indicating a request to bind a particular SIM/eSIM (identified by an ICCID value) with a particular IMEI value. The eUICC 108 can subsequently provide a response indicating acceptance of the binding. The IMEI binding logic 316 of the baseband module 308 can also query the eUICC 108 for currently used IMEI bindings, such as by sending an ES10c GetProfilesInfo command including a proprietary tag to indicate a request for the IMEI bindings in use by the eUICC 108. The eUICC 108 can respond by sending its current IMEI binding information to the IMEI binding logic 316.

An exemplary sequence of actions to bind an IMEI value to an eSIM 208 can include the following. An eSIM 208 can be installed into an ISD-P (applicable MNO security domain) of the eUICC 108 and not be enabled initially. There can be no IMEI value associated with the newly installed eSIM 208. The eSIM 208 can be subsequently enabled and associated with a cellular wireless service subscription of the mobile wireless device 102. The IMEI binding logic 316 of the baseband module 308 can send the proprietary ES10c command (bindIMEIRequest) to the eUICC 108 including a particular IMEI value and the ICCID value of the eSIM 208 in the proprietary E10c command. The eUICC 108 can store the particular IMEI value for the eSIM 208 in the ISD-P (MNO security domain). Each eSIM 208 installed on the eUICC 108 can have its own ISD-P (MNO security domain). The baseband module 308, via the IMEI binding logic 316, can subsequently query the eUICC 108 for IMEI binding information using a proprietary tag in a GetProfilesInfo ES10c command. The IMEI binding logic 316 can use a history of associations (bindings) of IMEI values to eSIMs 208 (and to physical SIMs) as an input to determine how to assign IMEI values when installing and/or when enabling eSIMs 208 on the eUICC 108 (or when installing a pSIM in the mobile wireless device 102).

Different MNOs can have different policies regarding the use of IMEI values. Some MNOs keep track of and care about IMEI values associated with cellular wireless subscriptions, while some MNOs do not. Carrier bundle information, provided to the mobile wireless device 102 during manufacture in the factory or afterward via an update in the field, can include information indicating whether an MNO associates IMEI values with cellular wireless subscriptions in their network infrastructure back end systems. When the IMEI binding logic 316 determines that two different cellular wireless subscriptions may be assigned to an identical IMEI value, e.g., when they each have the same most recently used IMEI value and both are to be active at the same time, the IMEI binding logic 316 can use the carrier bundle information to determine whether IMEI bindings matter to the MNOs with which the cellular wireless subscriptions are associated. For those MNOs that do maintain IMEI value associations, the IMEI binding logic 316 can seek to use the same IMEI value for those MNOs, i.e., to use a particular IMEI value consistently for the SIMS/eSIMs of that MNO.

FIG. 4 illustrates a table 400 of exemplary ES10c IMEI binding commands, including the proprietary BindIMEIRequest ES10c command, and an associated proprietary BindIMEIResponse ES10c command. A proprietary tag can also be added to a standard GetProfilesInfo ES10c command (not shown). When the proprietary tag is included in the GetProfilesInfo ES10c command, the eUICC 108 can return IMEI binding information for each eSIM 208 installed on the eUICC 108. If no IMEI binding information for an eSIM 208 is available, the eUICC 108 can provide a special value indicating so.

Figure 5:
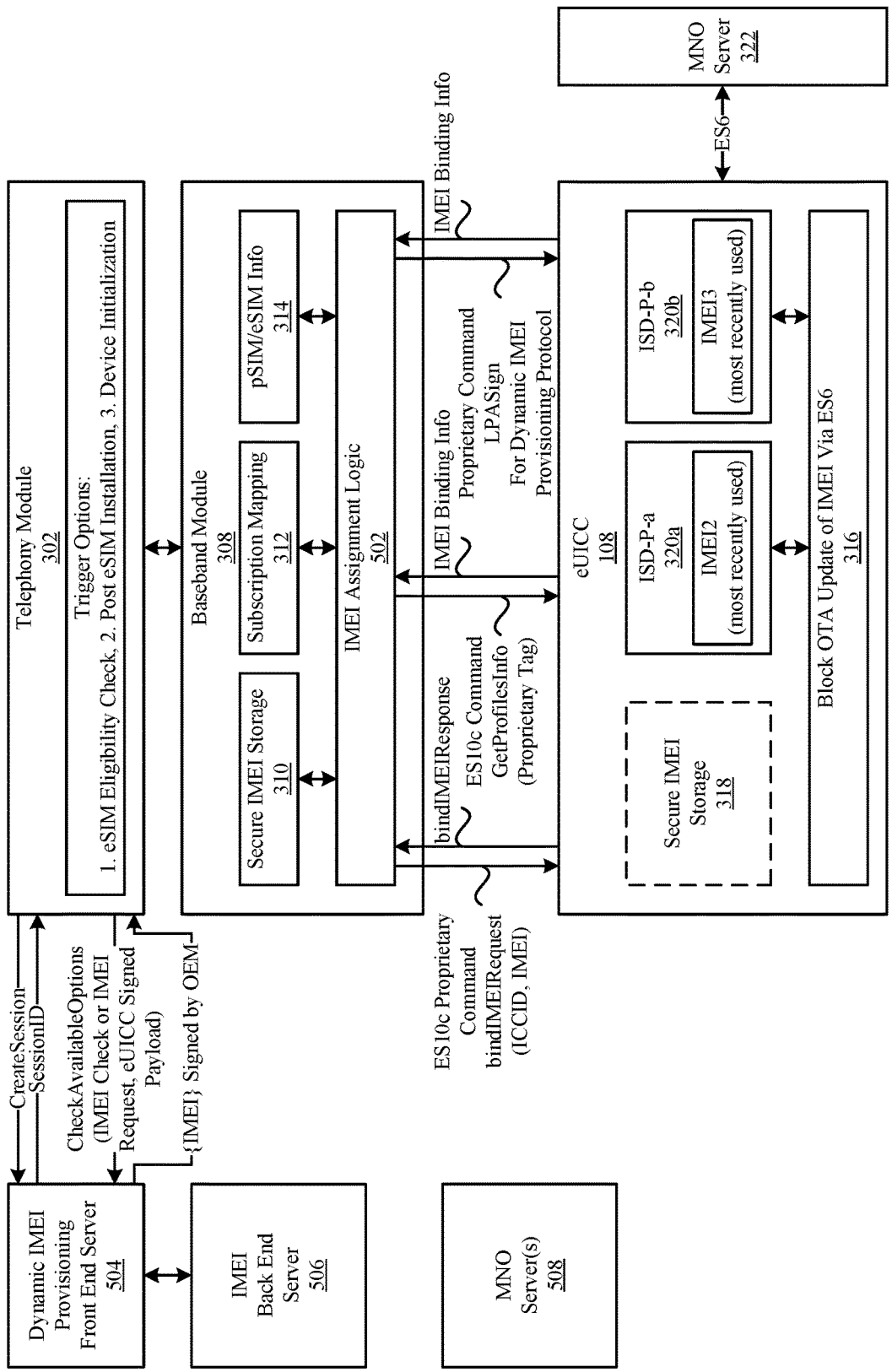
FIG. 5 illustrates a block diagram of an exemplary system for dynamic IMEI provisioning for a wireless device, according to some embodiments.

FIG. 5 illustrates a block diagram 500 of an exemplary system for dynamic IMEI provisioning for a mobile wireless device 102. During manufacturing of the mobile wireless device 102, a limited number of IMEI values can be assigned to the mobile wireless device 102, e.g., one IMEI value for a single SIM/eSIM device and two IMEI values for a DSDS (e.g., dual SIM or SIM+eSIM) device. Additional IMEI values can be assigned to the mobile wireless device 102 as needed after manufacture of the device (e.g., in the field when SIMs/eSIMs in active use by the mobile wireless device 102 change). The telephony module 302 of the mobile wireless device 102 can obtain an IMEI value when a trigger condition occurs. Example triggers can include: i) an eligibility check for an eSIM 208 during an eSIM installation procedure, ii) a post eSIM installation procedure to acquire a spare IMEI value in anticipation of a future eSIM installation, and iii) upon device initialization (post-sale unboxing or device reset by a user). The telephony module 302 can establish a secure communication channel with a dynamic IMEI provisioning front end server 504, e.g., via transmission of a CreateSession command and receipt of an applicable response, e.g., a randomly assigned one-time SessionID value. The telephony module 302 can subsequently send a command, e.g., a CheckAvailableOptions command, that includes a value indicating a request to check for IMEI values and/or for acquiring one or more new IMEI values for the mobile wireless device 102. The CheckAvailableOptions command can also include an eUICC signed payload for verification by the dynamic IMEI provisioning front end server 504. The dynamic IMEI provisioning front end server 504 can return one or more IMEI values. The IMEI values returned by the dynamic IMEI provisioning front end server 504 can be signed by the OEM for validation before storing the IMEI values for use on the mobile wireless device 102. In some embodiments, a check for IMEI values returns those IMEI values already assigned to the mobile wireless device 102. In some embodiments, a request for new IMEI values returns one or more newly assigned IMEI values for use by the mobile wireless device 102. In some embodiments, the dynamic IMEI provisioning front end server 504 is managed by an original equipment manufacturer (OEM) of the mobile wireless device 102 and/or by a third party. In some embodiments, an IMEI back end server 506 can provide storage of IMEI values in use by mobile wireless devices 102 of the OEM. The dynamic IMEI provisioning front end server 504 and/or the IMEI back end server 506 can communicate with one or more MNO servers 508, such as when assigning IMEI values to a mobile wireless device 102 or in response to queries from an MNO server 508 regarding IMEI values assigned to the mobile wireless device 102. IMEI values dynamically assigned to the mobile wireless device 102 can be securely stored in the secure IMEI storage 310 of the baseband module 308 of the mobile wireless device 102. In some embodiments, IMEI values for the mobile wireless device 102 can also be stored securely in secure IMEI storage 318 on the eUICC 108. In some embodiments, a particular IMEI value can be bound to a physical SIM, while a set of additional IMEI values can be used for eSIMs 208. In some embodiments, an IMEI value for a physical SIM can be stored in the eUICC 108. Communication of IMEI information, e.g., IMEI binding assignments and IMEI binding information responsive to queries, between the baseband module 308 and the eUICC 108 can be realized by IMEI assignment logic 502. In some embodiments, the IMEI binding logic 316 of FIG. 3 and the IMEI assignment logic 502 of FIG. 5 can be realized in a combined logic element of the baseband module 308.

Figure 6:
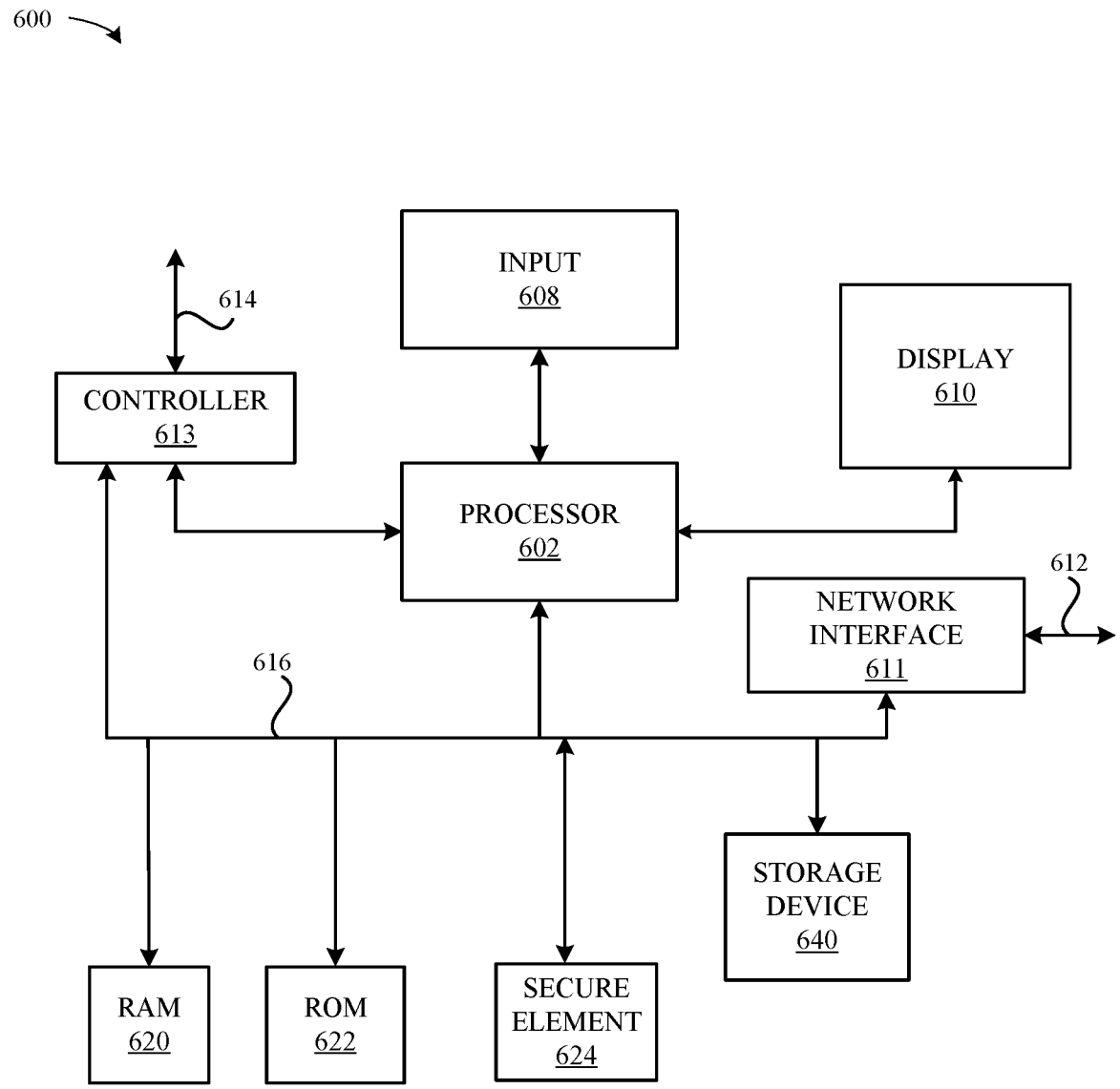
FIG. 6 illustrates a block diagram of exemplary elements of a mobile wireless device, according to some embodiments.

FIG. 6 illustrates a detailed view of a representative computing device 600 that can be used to implement various methods described herein, according to some embodiments. In particular, the detailed view illustrates various components that can be included in the mobile wireless device 102. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 that can be controlled by the processor 602 to display information to the user. A data bus 616 can facilitate data transfer between at least a storage device 640, the processor 602, and a controller 613. The controller 613 can be used to interface with and control different equipment through an equipment control bus 614. The computing device 600 can also include a network/bus interface 611 that communicatively couples to a data link 612. In the case of a wireless connection, the network/bus interface 611 can include a wireless transceiver.

The computing device 600 also includes a storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600. The computing device 600 further includes a secure element 624, which can include an eUICC 108 on which to store one or more eSIMs 208 and/or a UICC 118 (physical SIM card).

Representative Embodiments

In some embodiments, a method for binding IMEI values with physical SIMS included in UICCs 118 of a mobile wireless device 102 and/or with eSIMs 208 included in an eUICC 108 of the mobile wireless device 102 can include: i) determining a configuration of physical SIMs and eSIMs 208 of the mobile wireless device 102; ii) determining a subscription mapping of the physical SIMs and eSIMs 208 that are in active use, e.g., enabled; iii) determining whether the active SIMS and eSIMs 208 have been previously associated with IMEI values; iv) selecting an IMEI value stored in a secure storage of the mobile wireless device 102 to associate with an eSIM of the mobile wireless device 102; and v) sending, to the eUICC 108 by a processor 104 of the mobile wireless device 102, a command to bind the selected IMEI value to the eSIM, where the selected IMEI value is a most recently used IMEI value previously associated with the eSIM.

In some embodiments, the eUICC stores most recently used IMEI values for SIMS and eSIMs 208 of the mobile wireless device 102 in a secure storage container on the eUICC 108 of the mobile wireless device 102. For example, the secure storage container can be an ISD-P or an MNO security domain (SD) on the eUICC 108. In some embodiments, the eUICC 108 blocks over-the-air updates of most recently used IMEI values to protect against denial of service (DoS) attacks. In some embodiments, a most recently used IMEI value for an ICCID or a physical SIM can be saved in a secure storage of the mobile wireless device 102, e.g., on the eUICC 108 and/or in a memory external to the eUICC 108.

In some embodiments, a mobile wireless device 102 binds IMEI values based on most-recently used IMEI values for one or more physical SIMs and/or eSIMs 208 of the mobile wireless device 102. In some embodiments, when a physical SIM and/or an eSIM 208 is used for a single SIM subscription or a DSDS configuration, the mobile wireless device 102 can query secure storage for most-recently used IMEI information. The IMEI information can be stored securely in an eUICC 108 of the mobile wireless device 102 and/or in secure storage of the mobile wireless device 102 that is external to the eUICC 108. In some embodiments, the mobile wireless device 102 selects a most-recently used IMEI value to associate with a physical SIM or an eSIM 208 to reduce a probability of changing IMEI values for a particular cellular wireless service subscription, which may otherwise trigger a fraud detection mechanism at an MNO infrastructure system or at another information technology (IT) system.

In some embodiments, a mobile wireless device 102 binds IMEI values based on an MNO configuration for both physical SIMs and eSIMs. The mobile wireless device 102 can maintain MNO configurations for each MNO, including whether an MNO provisioning system accounts for IMEI values associated with physical SIMS and/or eSIMs. When binding an IMEI value to a physical SIM or eSIM 208, the mobile wireless device 102 can prioritize associating an IMEI values based on a past history of IMEI value usage, particularly with cellular wireless service subscriptions for MNOs that account for the IMEI values. In some embodiments, when two cellular wireless service subscriptions have been previously associated with an identical IMEI value, the mobile wireless device 102 prioritizes using the same IMEI value with the MNO that accounts for (has a dependency on) the IMEI value selected for association.

In some embodiments, a mobile wireless device 102 can dynamically provision IMEI values after manufacture. A network-based server can include logic to determine whether to assign one or more new IMEI values to the mobile wireless device 102. An eUICC 108 of the mobile wireless device 102 can send signed payloads to the network-based server, providing attestation to possession by the mobile wireless device 102 of an active eUICC 108. The network-based service can use eUICC identifier (EID) information included in a certificate provided by the eUICC 108 to determine whether the eUICC 108 is associated with a particular original equipment manufacturer (OEM). The mobile wireless device 102 can send a list of meta-data to the network-based server to use as an input for IMEI assignment logic executing on the network-based server. Representative meta-data can include a device serial number and information about one or more IMEI values presently stored on the mobile wireless device 102.

In some embodiments, a mobile wireless device 102 uses one or more triggers to request assignment of an IMEI value for one or more SIMS and/or eSIMs 208 of the mobile wireless device 102. Representative triggers can include determining new IMEI values are required during a device initialization procedure, e.g., during an unboxing or after a factory reset of the mobile wireless device 102. In some embodiments, the mobile wireless device 102 can determine to obtain a new IMEI value after installation of an eSIM 208 to an eUICC 108 of the mobile wireless device 102, where the new IMEI value can be stored in preparation for future installation of another eSIM 208 to the eUICC 108 of the mobile wireless device 102. The mobile wireless device 102 can assign the stored IMEI value during installation of the another eSIM 208. In some embodiments, an eSIM installation procedure can include a handshake process with a network-based server that manages assignment of IMEI values for eSIMs under installation.

In some embodiments, the mobile wireless device 102 securely stores IMEI values in an eUICC 108 of the mobile wireless device 102. IMEI values can be signed by a known entity for which a root key is pre-loaded on the eUICC 108 to establish a trust relationship between the known entity and the eUICC 108. The eUICC 108 of the mobile wireless device 102 can validate signatures that accompany IMEI values provided by the known entity before storing the IMEI values. The eUICC 108 of the mobile wireless device 102 can prevent unauthorized updates of stored IMEI values, including blocking changes to IMEI values by SIM/eSIM OTA updates. In some embodiments, the eUICC 108 stores IMEI values in a secure domain, e.g., an ISD-R, and prevents unauthorized access to the stored IMEI values, such as disallowing applets stored in an eSIM 208 from accessing or changing the stored IMEI values.

In some embodiments, a mobile wireless device 102 dynamically informs one or more MNO servers of IMEI values assigned to SIMs/eSIMs. The MNO servers can be apprised of the IMEI value assignments after the mobile wireless device 102 has been manufactured, i.e., post-factory. In some embodiments, the mobile wireless device 102 creates application programming interfaces (APIs) and notifications to inform MNOs of assigned IMEI values. In some embodiments, IMEI information for one or more SIMs and/or one or more eSIMs of the mobile wireless device 102 are aggregated to include both IMEI values assigned during manufacture and IMEI values dynamically assigned post-manufacture.

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for binding international mobile equipment identifier (IMEI) values with electronic subscriber identity modules (eSIMs) on a wireless device, the method comprising:
by a processor of the wireless device external to an embedded universal integrated circuit card (eUICC) of the wireless device:
detecting a command to enable a first eSIM on the eUICC of the wireless device;
sending a query command to the eUICC for IMEI binding information; and
receiving from the eUICC the IMEI binding information indicating associations between IMEI values and ICCID values of one or more eSIMs on the eUICC;
when the first eSIM has not been previously associated with an IMEI value, obtaining from a network-based server an assigned IMEI value for the first eSIM;
when the first eSIM has been previously associated with an IMEI value, selecting a most recently used IMEI value for the first eSIM; and
sending a command to the eUICC to bind the assigned IMEI value or the most recently used IMEI value to the first eSIM.

2. The method of claim 1, further comprising:
by the eUICC of the wireless device:
installing the first eSIM in a mobile network operator (MNO) security domain on the eUICC before enablement of the first eSIM,
wherein no IMEI value is associated with the installed first eSIM.

3. The method of claim 1, wherein the command sent to the eUICC comprises a proprietary ES10c command for binding a particular IMEI value with a particular eSIM.

4. The method of claim 3, wherein the proprietary ES10c command includes the assigned IMEI value or the most recently used IMEI value and an integrated circuit card identifier (ICCID) value of the first eSIM.

5. The method of claim 1, further comprising:
by the processor of the wireless device external to the eUICC:
detecting a command to enable a second eSIM of the eUICC of the wireless device;
determining the second eSIM of the eUICC has been previously associated, most recently, with the most recently used IMEI value for the first eSIM; and
when respective cellular wireless subscriptions for the first eSIM and the second eSIM allow identical IMEI values to be used for multiple active eSIMs on the eUICC, sending a command to the eUICC to bind the most recently used IMEI value to the second eSIM.

6. The method of claim 1, further comprising:
by the eUICC of the wireless device:
receiving an over-the-air (OTA) update for the first eSIM from a mobile network operator (MNO) server associated with the first eSIM; and
blocking changes by the OTA update to the IMEI value bound to the first eSIM.

7. The method of claim 1, further comprising:
by the eUICC of the wireless device:
maintaining, within one or more mobile network operator (MNO) security domains on the eUICC, records of most recently used IMEI values bound to eSIMs in the MNO security domains.

8. The method of claim 1, further comprising:
by the processor of the wireless device external to the eUICC:
selecting IMEI values to bind to eSIMs when installing and/or when enabling eSIMs on the eUICC based at least in part on a history of bindings of IMEI values to eSIMs on the eUICC of the wireless device.

9. A method for dynamic international mobile equipment identifier (IMEI) provisioning for a wireless device, the method comprising:
by a processor of the wireless device external to an embedded universal integrated circuit card (eUICC) of the wireless device:
detecting a trigger condition for obtaining additional IMEI values for the wireless device;
responsive to detection of the trigger condition, establishing a secure communication channel with a dynamic IMEI provisioning network-based server;
obtaining, via the secure communication channel, one or more new IMEI values for the wireless device;
storing, in secure storage on the wireless device, the one or more new IMEI values to be available for subsequent binding to physical subscriber identity modules (pSIMs) and/or electronic SIMs (eSIMs) of the wireless device; and
selecting IMEI values to bind to eSIMs when installing and/or when enabling eSIMs on the eUICC based at least in part on a history of bindings of IMEI values to eSIMs on the eUICC of the wireless device.

10. The method of claim 9, further comprising:
by the processor of the wireless device external to the eUICC:
retrieving, from the secure storage, an IMEI value; and
binding the IMEI value to a pSIM or eSIM of the wireless device.

11. The method of claim 10, wherein:
the pSIM or eSIM of the wireless device comprises a newly inserted pSIM; and
the IMEI value is stored in secure storage in the eUICC of the wireless device.

12. The method of claim 10, wherein:
the pSIM or eSIM of the wireless device comprises a newly installed or enabled eSIM on the eUICC; and
the IMEI value is stored in secure storage external to the eUICC of the wireless device.

13. The method of claim 9, further comprising:
by the processor of the wireless device external to the eUICC:
obtaining, via the secure communication channel, a set of IMEI values currently assigned to the wireless device before obtaining the one or more new IMEI values.

14. The method of claim 9, further comprising:
by the processor of the wireless device external to the eUICC:
validating the one or more new IMEI values based on an accompanying signature before storing the one or more new IMEI values.

15. An apparatus configured for binding international mobile equipment identifier (IMEI) values with electronic subscriber identity modules (eSIMs) on a wireless device, the apparatus comprising:

a processor of the wireless device external to an embedded universal integrated circuit card (eUICC) of the wireless device, the processor communicatively coupled to a memory storing instructions that, when executed by the processor, cause the processor to perform actions that include:

detecting a command to enable a first eSIM on the eUICC of the wireless device;

sending a query command to the eUICC for IMEI binding information; and receiving from the eUICC the IMEI binding information indicating associations between IMEI values and ICCID values of one or more eSIMs on the eUICC;

when the first eSIM has not been previously associated with an IMEI value, obtaining from a network-based server an assigned IMEI value for the first eSIM;

when the first eSIM has been previously associated with an IMEI value, selecting a most recently used IMEI value for the first eSIM; and sending a command to the eUICC to bind the assigned IMEI value or the most recently used IMEI value to the first eSIM.

16. The apparatus of claim 15, wherein:
the command sent to the eUICC comprises a proprietary ES10c command for binding a particular IMEI value with a particular eSIM.

17. The apparatus of claim 16, wherein:
the proprietary ES10c command includes the assigned IMEI value or the most recently used IMEI value and an integrated circuit card identifier (ICCID) value of the first eSIM.

18. The apparatus of claim 15, wherein execution of the instructions further causes the apparatus to perform additional actions that include:

detecting a command to enable a second eSIM of the eUICC of the wireless device;

determining the second eSIM of the eUICC has been previously associated, most recently, with the most recently used IMEI value for the first eSIM; and when respective cellular wireless subscriptions for the first eSIM and the second eSIM allow identical IMEI values to be used for multiple active eSIMs on the eUICC, sending a command to the eUICC to bind the most recently used IMEI value to the second eSIM.

19. The apparatus of claim 15, wherein execution of the instructions further causes the apparatus to perform additional actions that include:

selecting IMEI values to bind to eSIMs when installing and/or when enabling eSIMs on the eUICC based at least in part on a history of bindings of IMEI values to eSIMs on the eUICC of the wireless device.

* * * * *